United States Patent [19]
Alexander

[11] 3,843,180
[45] Oct. 22, 1974

[54] SAFETY BUMPER
[75] Inventor: Willie L. Alexander, Lima, Ohio
[73] Assignee: C. A. McCullen, Lima, Ohio ; a part interest
[22] Filed: Jan. 22, 1973
[21] Appl. No.: 325,526

[52] U.S. Cl. .................................. 293/74, 293/99
[51] Int. Cl. .......................................... B60r 19/04
[58] Field of Search ............ 293/74, 75, 76, 77, 79, 293/71 R, 99

[56] References Cited
UNITED STATES PATENTS
| | | | |
|---|---|---|---|
| 1,726,191 | 8/1929 | Peacock | 293/74 |
| 1,844,216 | 2/1932 | Erickson | 293/74 |
| 2,157,657 | 5/1939 | Eaton | 293/74 |
| 2,793,900 | 5/1957 | Marshall | 293/71 R |
| 3,596,963 | 8/1971 | Phillips | 293/99 |

FOREIGN PATENTS OR APPLICATIONS
| | | | |
|---|---|---|---|
| 265,832 | 7/1929 | Italy | 293/74 |

Primary Examiner—M. Henson Wood, Jr.
Assistant Examiner—Robert Saifer
Attorney, Agent, or Firm—Clarence A. O'Brien and Harvey B. Jacobson

[57] ABSTRACT

A safety-type bumper for use on a motor vehicle, more particularly heavy duty trucks and the like and which is characterized by a centralized main body section of a length capable of spanning the associated body portion of the truck, and complemental spring-biased end sections. These end sections are pivotally or hingedly mounted on the respective end portions of the main body section. They are so bracketed and supported in place that they are normally cooperatively aligned with the body section. On the other hand, they are pressure responsive and are adapted to yieldingly pivot relative to the body section and, in so doing, to momentarily swing forwardly or rearwardly to a displaced position and then automatically spring back to assume and maintain a normal bumper functioning position.

9 Claims, 5 Drawing Figures

PATENTED OCT 22 1974  3,843,180
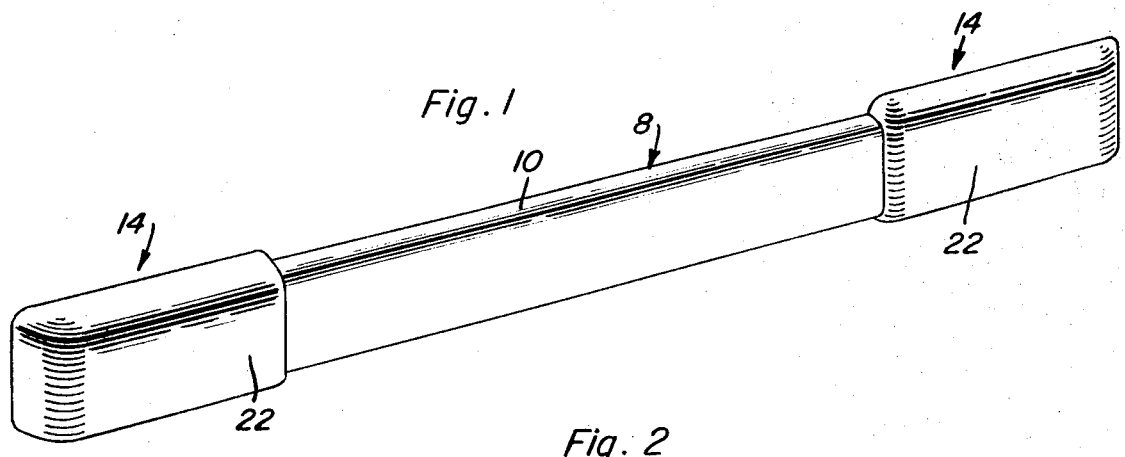
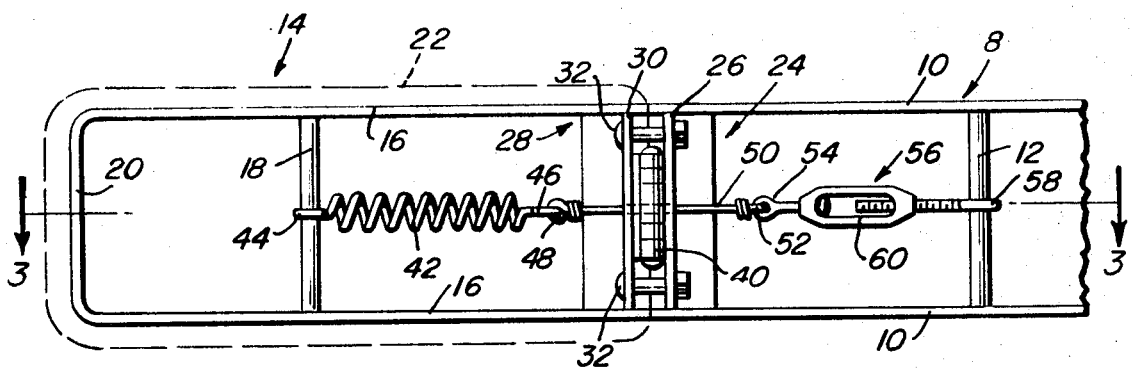
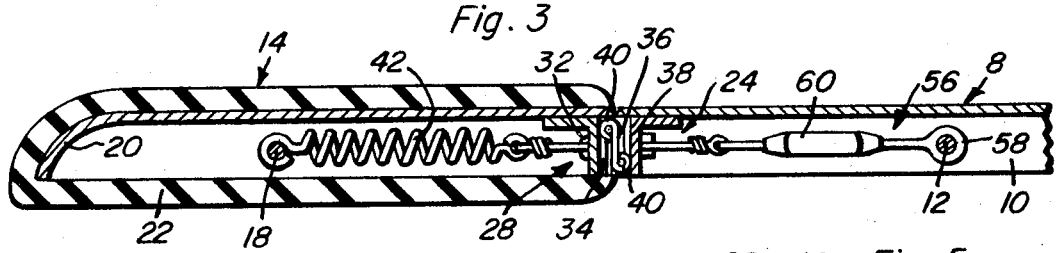
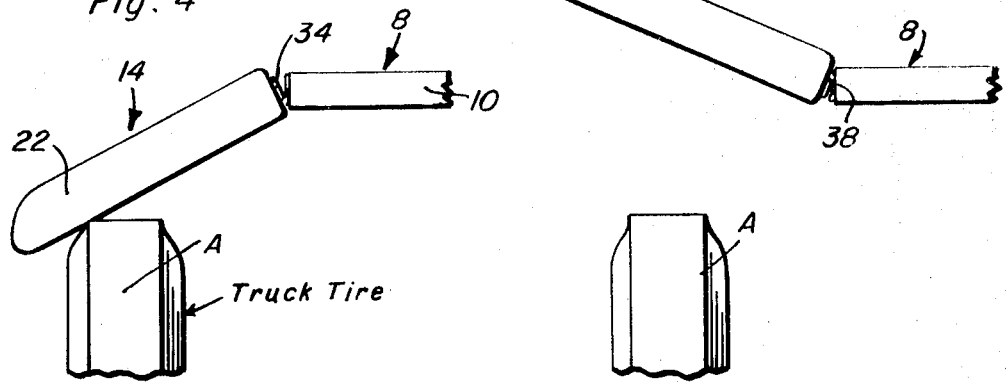

SAFETY BUMPER

This invention relates to certain new and useful improvements in motor vehicle bumpers and has to do, more particularly, with a sectional safety-type bumper which is expressly designed and adapted for use on heavy duty and equivalent trucks.

An object of the invention, broadly stated, is to provide a simple, practical and reliable truck bumper wherein the respective end sections are hingedly mounted on the ends of the body section, are capable of swinging forwardly or rearwardly and function in a manner that said end sections are virtually prevented from forcibly jamming themselves into the associated tires in a manner that would result in a blow-out or loss of steering control of the truck.

In carrying out the principles of the invention it is within the purview of the concept to utilize a conventional or ordinary bumper and to cut off the respective or terminal end sections and to then reconnect the inner ends thereof to the respective outer ends of the main section and, in so doing, to utilize hinging brackets, frangible shear pins or bolts and novel complemental spring-biasing means which functions to position and maintain the end sections in oriented and coordinating relationship to the main body section.

Persons conversant with the art to which the invention relates are aware that vehicle bumpers having pivotally mounted outer end sections provided with spring-biasing means are, generally stated, old and well known. For background information reference may be made to prior U.S. Pat. No. 1,224,817, granted on May 1, 1917, U.S. Pat. No. 1,475,758, granted on Nov. 27, 1923 and U.S. Pat. No. 1,705,119, granted on Mar. 12, 1929. In these prior patents the pivotally mounted end sections of the bumper pivot in a manner to minimize the likelihood of damage to the bumper which would occur if the end portions hook on a relatively stationary object such as a platform, post, tree, fire hydrant or the like.

Briefly the safety type truck bumper herein under consideration is characterized by a rigid elongated channel shaped main body section and complemental oriented and coordinating channel-shaped end sections. The outer ends of the body section have rigidly secured angle iron brackets. The inner coacting ends of the two end sections likewise have angle brackets. The adjacent confronting flanges of the respectively paired flanges are structurally and connectively joined by frangible or fracturable pressure responsive shear pins or bolts. Double hinges function to connect and operatively join the angle brackets of the respective pairs and also permit swinging displacement of the end sections of the bumper, either forwardly or rearwardly, relative to the oriented end portions of the body section. Reliably feasible spring-biasing means functions to interconnect the coacting ends of the main body section and the end sections.

Not only are the end sections hingedly mounted and spring-biased for primary safety purposes, the respective end sections are enclosed in firm compressibly resilient rubber or equivalent jackets in a manner to better cope with the overall problem.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a view in perspective of a safety type bumper constructed in accordance with the principles of the present invention.

FIG. 2 is an enlarged detail view with parts primarily shown in full lines and detailing one end section, the hinging spring-biasing means and also the pressure responsive shear bolts or pins.

FIG. 3 is a view taken approximately on the plane of the section line 3—3 of FIG. 2 looking in the direction of the indicating arrows.

FIG. 4 is a view in top plan showing how one hingedly mounted end section can be swung toward and permitted to come into contact with the tread of the associated tire.

FIG. 5 is a view similar to FIG. 4 and showing how the same end section could, under certain circumstances, be hooked and swung forwardly and in a direction away from the tire and main body section of the bumper.

Referring now to the views of the drawings the elongated channelshaped main body section is denoted by the numeral 8 and has upper and lower flanges 10. A vertical anchor pin 12 is shown and is lodged and secured between the flanges in the manner shown in FIGS. 2 and 3. The respective end sections are the same in construction and a description of one will suffice for both. With this in mind each end section is denoted, generally stated, by the numeral 14. As perhaps best shown in FIGS. 2 and 3 this end section is also channel-shaped and has upper and lower flanges 16 to accommodatingly support the vertical fixedly mounted anchor pin 18. The extreme outer end portion of this section is shown closed as at 20. In addition in the finished product the overall section is enclosed in a firm rubber or equivalent compressibly resilient protective and shock minimizing jacket 22. The outward end portion of the main body section is shown provided with a first angle type adapter bracket 24 one flange of which is denoted by the numeral 26. This bracket is suitably fixed between the flanges 10 and is located for cooperation with the second vertical angle or adapter bracket 28. The bracket 28 is fixed between the flanges of the end section and the flange 30 thereof is opposed to the flange 26. These two flanges are provided with bolt holes to accommodate the headed and nut-equipped shear pins or bolts 32.

In addition to the connecting pins or bolts the two flanges 26 and 30 are connectively united by an intervening double hinge which as shown in FIG. 3 comprises hinge leaves 34, 36 and 38 which leaves in turn are interconnected by cooperating knuckles 40 and associated hinge pintles (not detailed). By thus hinging the paired brackets it will be seen that the respective end sections 14 are capable of swinging rearwardly toward and in the direction of the tire A as shown in FIG. 4 and also forwardly in a direction away from the tire as shown in FIG. 5.

In addition to the angle type adapter brackets, hinging means and shear pins the invention also embodies the aforementioned spring-biasing means. This means as shown to advantage in FIGS. 2 and 3 comprises a suitably tensioned coil spring 42 having one end 44 anchored on the pin 18 and its other end 46 connected to an eye 48 on one end of a link 50. The other end of the link as at 52 is connected with an eye 54 forming a component part of the turnbuckle of the link as unit 56. An eye 58 at the right hand end in FIG. 2 is connected with the anchor pin 12 and the threaded shank is connected with the usual coupling member 60. If desired and instead of using a linking wire or flexible rod 50 it is within the purview of the invention to substitute a chain (not shown) therefor. In any event one end of the means, the turnbuckle 56, is connected with the anchor pin 12 and the other end, the spring, is connected with the anchor pin 18. By properly constructing and proportioning these component parts the spring-biasing means serves to normally maintain the end sections in alignment with the intervening main body section. It also functions to turn the end sections to normal position after contact has been had with a relatively stationary obstruction or object.

As was touched upon in the introductory portion of the specification it is within the purview of the invention to cut off the ends of an ordinary or conventional type bumper and then re-connect the same with the main bumper using the paired brackets, shear pins or bolts and spring-biasing means all as shown particularly in FIGS. 2 and 3.

Trial and error experience has shown that use of this three-part or sectional bumper well serves the safety promotion purposes for which it has been devised for practical and serviceable use. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. For use on a motor vehicle, a safety-type bumper comprising a main body section of a length capable of spanning the associated body portion of said vehicle, and complemental spring-biased end sections pivotally mounted on the respective end portions of said body section, said end sections being normally and cooperatively aligned with said body section, being pressure responsive, and adapted to yieldingly pivot relative to said body section and (1) momentarily swing to a displaced position and (2) automatically spring back to and assume a normal position, said end sections being designed and adapted upon striking a relatively stationary obstruction to yield and swing in a horizontal plane on a vertical pivoting axis and are capable of swinging either forwardly or rearwardly relative to said main section depending upon the impact encountered.

2. The bumper defined in claim 1, and wherein the pivotal mounting for each end section embodies paired hingedly joined angle brackets, and frangible pressure responsive shear pins connecting said paired angle brackets, said shear pins being normally intact but adapted to fracture when subjected to disruptive stress or strain, whereby to permit releasing of and safeguarding displacement of said end sections.

3. The bumper defined in claim 2, and wherein the brackets of each pair of brackets embody confronting spaced parallel rigid flanges having bolt holes, said shear pins comprising insertable and removable bolts of predetermined strength.

4. For use on a motor vehicle, a safety-type bumper comprising a main body section of a length capable of spanning the associated body portion of said vehicle, and complemental spring-biased end sections pivotally mounted on the respective end portions of said body section, said end sections being normally and cooperatively aligned with said body section, being pressure responsive, and adapted to yieldingly pivot relative to said body section and (1) momentarily swing to a displaced position and (2) automatically spring back to and assume a normal position, spring biasing means for each end section comprising a coil spring having an outer end anchored to a median portion of the associatively cooperable end section, a cooperatively aligned turnbuckle having an outer end anchored on said body section, and linking means joining the inner ends of said spring and turnbuckle.

5. The bumper defined in claim 1, and wherein each end section is completely enclosed in a firm but compressibly resilient shock absorbing jacket.

6. A safety-type truck bumper comprising an elongated channel-shaped main body section and complemental oriented and coordinating channel-shaped end sections, the outer ends of said body section having rigidly secured angle iron brackets, the inner coating ends of said end sections likewise having angle brackets, adjacent confronting flanges of the respectively paired flanges being connectively joined by frangible pressure responsive shear bolts, double hinges connected to and operatively joining the angle brackets of the respective pairs together and permitting swinging displacement of the end sections either forwardly or rearwardly relative to the oriented end portions of said body section, and spring-biasing means interconnecting the coacting ends of said main body and end sections.

7. The bumper defined in and according to claim 6, and wherein the spring biasing means for each end section comprises a coil spring having an outer end anchored to a median portion of the associatively cooperable end sections, a cooperatively aligned turnbuckle having an outer end anchored on said body section, and linking means joining the inner ends of said spring and turnbuckle.

8. The bumper as defined in claim 6, wherein said shear bolts are normally intact, but are fractured when subjected to disruptive stress or strain, thus permitting the release displacement of said end sections.

9. A safety-type bumper comprising a main body section of a length capable of transversely spanning the front end of a major portion of an associated body portion of a vehicle having tires adjacent the bumper, and at least one end section pivotally mounted on a respective end portion of said main body section for pivoting toward an adjacent tire, said end section being normally, cooperatively, aligned with said main body section and further embodying frangible, pressure-responsive shear means retaining the end section in normal position and adapted to fracture under stress, hinge means interconnecting the inner end of the end section and the respective end portion of the main body section, thus permitting the end section to be displaced inwardly toward an adjacent tire, and enclosed resilient means, elongated in said transverse direction, interconnecting the end section and the main body section to pivotally swing said end section away from the adjacent tire and back to its normal position, after the shear means has been fractured and the end section has been displaced toward the adjacent tire.

\* \* \* \* \*